United States Patent
Ravat

(10) Patent No.: US 7,740,040 B2
(45) Date of Patent: Jun. 22, 2010

(54) BOTTOM ZONE TURN-UP MEMBRANE

(75) Inventor: Stéphane Ravat, Clermont-Ferrand (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 859 days.

(21) Appl. No.: 11/639,607

(22) Filed: Dec. 14, 2006

(65) Prior Publication Data

US 2007/0131355 A1   Jun. 14, 2007

(30) Foreign Application Priority Data

Dec. 14, 2005  (FR) ................................. 05 13097

(51) Int. Cl.
B29D 30/26 (2006.01)
B29D 30/32 (2006.01)

(52) U.S. Cl. ................ 156/401; 156/132; 156/415
(58) Field of Classification Search ........... 156/401, 156/414, 415, 132
See application file for complete search history.

(56) References Cited

U.S. PATENT DOCUMENTS

| | | | |
|---|---|---|---|
| 5,141,588 A * | 8/1992 | VanBuskirk | 156/401 |
| 5,385,620 A * | 1/1995 | Sato et al. | 156/131 |
| 6,585,022 B1 | 7/2003 | Rex | |
| 6,676,788 B1 | 1/2004 | Roedseth et al. | |

FOREIGN PATENT DOCUMENTS

| DE | 34 21 165 A1 | 12/1985 |
|---|---|---|
| EP | 0 492 239 A | 7/1992 |
| EP | 1 510 330 A | 3/2005 |

* cited by examiner

*Primary Examiner*—Geoffrey L Knable
(74) *Attorney, Agent, or Firm*—Cohen Pontani Lieberman & Pavane LLP

(57) ABSTRACT

A shaping drum for a tire blank comprising bottom zones formed of a circular reinforcement ring which is moved in rotation about an axis XX', comprising bead-holding means (2a, 2b) mounted opposite one another on a central spindle. Each of the bead-holding means comprises a support (5a, 5b) mounted to be axially movably relative to the spindle. An assembly of return segments (9a, 9b) is distributed circumferentially around the axis XX', which circulate radially between two circular rings (6a, 7a, 6b, 7b) fixed on the support (5a, 5b), and comprises a bead-receiving seat (10a, 10b). A turn-up membrane (12a, 12b) can slide over the bead-receiving seat, anchored in an airtight manner by its two ends (121a, 122a, 121b, 122b) on the radially outer circumference of the circular rings (6a, 7a, 6b, 7b) and anchored mechanically by appropriate means (14a, 14b) on the return segments (9a, 9b) along a circumferential anchoring line (90a). The section of the bead-receiving seat (10a, 10b) is of essentially circular shape with a developed length L1, and the circumferential anchoring line of the turn-up membrane (121, 12b) on the return segments (9a, 9b) is axially offset towards the centre of the drum by a length L2 relative to the bead receiving seat (10a, 10b), the length L2 being between 0.7 and 2 times the length L1.

6 Claims, 6 Drawing Sheets

BOTTOM ZONE TURN-UP MEMBRANE

FIELD OF THE INVENTION

The invention concerns assembly drums for the production of tires for fitting on automobile vehicles.

BACKGROUND OF THE INVENTION

According to a known method tire blanks are fabricated by assembling profiled rubber products in a first stage on a first drum of generally cylindrical shape to obtain a sleeve most commonly called a carcass. The carcass usually comprises a carcass reinforcement ply anchored at its two axial ends to circumferential reinforcing rings designed to constitute the bottom zone of the tire, and profiled elements designed to ensure that the tire is airtight or to reinforce particular zones.

In a second stage the carcass is placed on means suitable for transforming the cylindrical tire blank formed by the carcass into a tire blank of toroidal shape.

After having carried out this stage, known as the shaping stage, it is then possible to assemble the elements that constitute the crown zone which comprises, inter alia, the crown reinforcement plies and a tire tread.

This transformation can be carried out by inflating a membrane placed inside the cylindrical sleeve between the two bead reinforcement rings.

More generally, the carcass is arranged on shaping and assembly means comprising two receiving means positioned opposite one another and designed to hold the carcass to be shaped by its beads. These holding means can preserve airtight contact with the said beads. The shaping operation is carried out by increasing the air pressure inside the volume delimited by the holding means and by the tire carcass, and bringing the holding means axially closer together.

The holding means generally comprise a circumferential element that can move radially. In its expanded position this gripping means ensures holding and airtightness at the level of the bead. In its retracted position the said means allow the carcass to be introduced and the tire blank to be extracted.

In addition it is also possible to add means for holding the bottom zone located axially inside the volume delimited by the tire, or even a turn-up membrane arranged axially outside the volume delimited by the tire and designed to hold down the rubber profiled elements previously arranged on an assembly zone of the shaping and assembly drum.

These technologies are described, for example, in the patent EP 468 580 or in the patent DE 39 07 121.

Note that the shaping and assembly means described in those patents are particularly well suited for shaping carcasses whose bottom zone comprises a reinforcement ring around which it is not necessary to turn up the anchoring of the carcass reinforcement ply and the products that constitute the bead while the carcass is being changed from the cylindrical to the toroidal shape.

It can also be advantageous to position the profiled elements designed to form the bottom zone of the tire before introducing the carcass. These products can undergo axial displacements that are uncontrolled and incompatible with the assembly precision sought during the gripping of the carcass.

To that end, the publication EP 492 239 proposes to put in place a circumferential anchoring line capable of preventing any axial slip of the membrane in this zone. This anchoring line is generally located vertically above the zone in which the bead block is arranged. A drum of this type is shown schematically in FIG. 1.

This drum according to the known prior art comprises a central spindle 1 connected to a frame (not shown) and driven in rotation by a motor (not shown) about the axis XX'. The rotation spindle 1 supports two holding means for the beads (2a, 2b) mounted opposite one another relative to the plane of symmetry YY'. Each bead-holding means comprises a support (5a, 5b) which slides axially on the central spindle 1. The sliding supports (5a, 5b) are arranged so as to make airtight contact with the central spindle 1. Each sliding support also comprises an assembly of return segments (9a, 9b) distributed circumferentially around the axis XX', which can move radially under the action of an axially mobile slider (11a, 11b). The return segments (9a, 9b) comprise a seat for receiving the beads (10a, 10b) and can exert a radial pressure on the carcass beads.

Two circular rings (6a, 7a, 6b, 7b) are fixed to the two axial ends of the sliding support and serve to guide the return segments (9a, 9b) during the radial movement of the said segments.

A turn-up membrane (12a, 12b) is anchored in an airtight manner by its two axial ends (121a, 122a, 121b, 122b) on the radially outer circumference of each of the rings (6a, 7a, 6b, 7b). The rings (7a, 7b) located at the axial end of the sliding support (2a, 2b) support an extender (8a, 8b) on which the lobe of the holding down membrane (12a, 12b) rests.

As shown in FIG. 1, it can be particularly advantageous to anchor the two axial ends of the turn-up membrane (121a, 122a, 121b, 122b) directly on the inner ring (6a, 6b), on the one hand to ensure the airtightness of the part of the bead-holding means that comprises the radially mobile return segments (9a, 9b), and on the other hand to enclose the bead as completely as possible when the turn-up membrane is actuated, so as to assist the pressing against the shaped carcass of the rubber products previously arranged on the lateral extenders (8a, 8b).

The turn-up membrane covers the bead-receiving seat (10a, 10b), which also assists airtight contact between the bead of the tire to be shaped and the receiving zone (10a, 10b) during the radial expansion of the return segments. The membrane can also slide over the bead-receiving seats (10a, 10b).

Each holding means (2a, 2b) is drawn axially along the central spindle 1 by mobile clamps (3a, 3b) which move axially under the action of the rotation of a motorised screw 13 in openings (4a, 4b) formed in the central spindle 1. This axial movement allows control of the mutual approach of the beads during the shaping operation.

Means (not shown) are provided to allow compressed air to be injected into the central space delimited by the central spindle and the bead holding means.

Thus, the shaping drum according to the known prior art comprises bead-holding means (2a, 2b) mounted opposite one another on a central spindle (1), each of the said bead-holding means comprising:

a support (5a, 5b) mounted on and able to move axially relative to the said spindle (1);

an assembly of return segments (9a, 9b) distributed circumferentially around the axis XX', which circulate radially between two circular rings (6a, 7a, 6b, 7b) fixed on the support (5a, 5b), and comprising a bead-receiving seat (10a, 10b);

a turn-up membrane (12a, 12b) that can slide over the bead-receiving seat, anchored in an airtight manner by its two ends (121a, 122a, 121b, 122b) on the radially outer circumference of the circular rings (6a, 7a, 6b, 7b). The membrane is also anchored mechanically by suitable means (14a, 14b) to the return segments (9a, 9b)

along a circumferential anchoring line located between the anchorings of the ends (121a, 122a, 121b, 122b).

Note, however, that the anchoring line is preferably located opposite the bead heel receiving zone.

This type of drum is particularly suitable for producing tire blanks in which the carcass is not turned around the reinforcement ring during the shaping operation. Axial displacement is blocked in both directions by the circumferential anchoring, and the bottom zone is held in an airtight way during the shaping operation.

On the other hand, when the section of the bottom zone reinforcement ring is circular, the carcass reinforcement ply and the products constituting the bead rotate around the reinforcement ring. It is then appropriate to arrange that the receiving means fitted on the flanges, which ensure airtight contact with the bead, can also be moved in rotation so as to go along with the movement of the bead during the rotation of the bottom zone around the reinforcement ring. In other words, the rotation of the bead around the reinforcement ring of the bottom zone brings about axial sliding of the turn-up membrane.

SUMMARY OF THE INVENTION

One object of the present invention is to solve the problem posed by the assembly and shaping of tires that comprise bottom zones formed of a circular reinforcement ring, for which it is desired both:

to first position profiled elements designed to form the bottom zone, which entails controlling the displacements in the axial direction on the one hand, to carry out the shaping by rotating the constituents of the bottom zone around the reinforcement ring.

According to an embodiment of the invention, the turn-up membrane (12a, 12b) is anchored mechanically by appropriate means (14a, 14b) on the return segments (9a, 9b) along a circumferential anchoring line offset axially towards the centre of the drum relative to the bead-receiving seat (10a, 10b).

The mechanical anchoring (14a, 14b) arranged according to an embodiment of the invention blocks the axial sliding of the membrane in the axial direction from the centre of the shaping drum towards the outside edge of the said drum. In effect, it has been observed that it is only necessary to block axial movement in that direction in order to keep the products in place during the radial expansion phase of the return segments.

On the other hand, during the phase of shaping and rotating the bead around the bottom zone reinforcement ring, the bead pulls the turn-up membrane which slides over the bead-receiving seats. The portion of the turn-up membrane located between the bead and the anchoring zone is subjected to compression and can be made to buckle and form a loop. This phenomenon is illustrated in FIGS. 6 and 7 of the present description and will be explained in more detail in later paragraphs.

For this buckling phenomenon to take place, the position of the circumferential anchoring line relative to the bead receiving seat must be determined carefully.

As illustrated in FIG. 3a, the receiving seat 10a of a drum of the type designed to produce tires whose bead rotates around the reinforcement ring during the shaping phase has a section of essentially semicircular shape to receive and hold the rotating bead.

A first length L1 can be calculated, which is essentially equal to the developed length of the section of the said seat 10a. The length L2 is the distance between the inner edge of the bead-receiving seat 10a and the position of the circumferential anchoring line.

It has been shown that the rotation of the bead takes place without problems when the length L2 is greater than 0.7L1. That ratio characterises the threshold above which the buckling phenomenon mentioned above takes place. The said threshold is also representative of the rigidity of the membranes currently used in the tire industry.

However, the ratio in question cannot be increased arbitrarily. In effect, as the length L2 increases it becomes difficult to control the axial position of the profiled elements designed to form the bottom zone, because the lower degree of compression of the membrane towards the centre of the drum brings about an axial movement in that direction. It has been found experimentally that the length L2 must be less than 2 times the length L1.

Thus, an aspect of the invention concerns a drum having the characteristics described above, in which the section of the bead-receiving seat 10a has an essentially circular shape of developed length L1 and in which the circumferential anchoring line of the turn-up membrane 12a, 12b on the return segments 9a, 9b is offset axially towards the centre of the drum by a length L2 in relation to the bead-receiving seat 10a, 10b, the length L2 being between 0.7 and 2 times the length L1.

The device according to an embodiment of the invention can provide a simple and easy solution for the problem posed, and can bring the advantages of precision and regularity of use that are appropriate for this type of shaping drum.

BRIEF DESCRIPTION OF THE DRAWINGS

The invention is described in detail in FIGS. 2 to 8 with reference to FIG. 1, which illustrates the closest known prior art and in which.

DETAILED DESCRIPTION OF THE DRAWINGS

Figure 1:
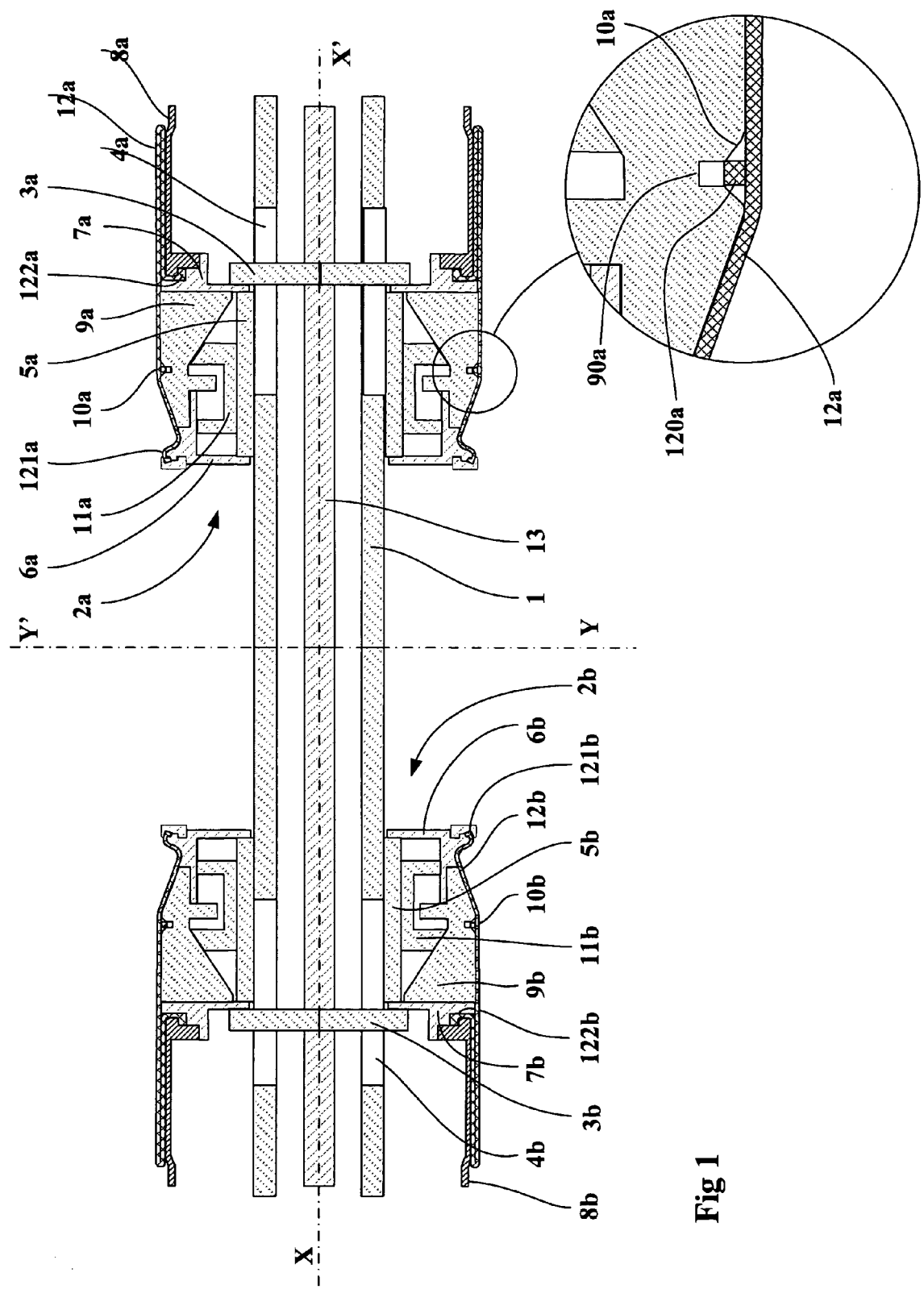
Figure 2:
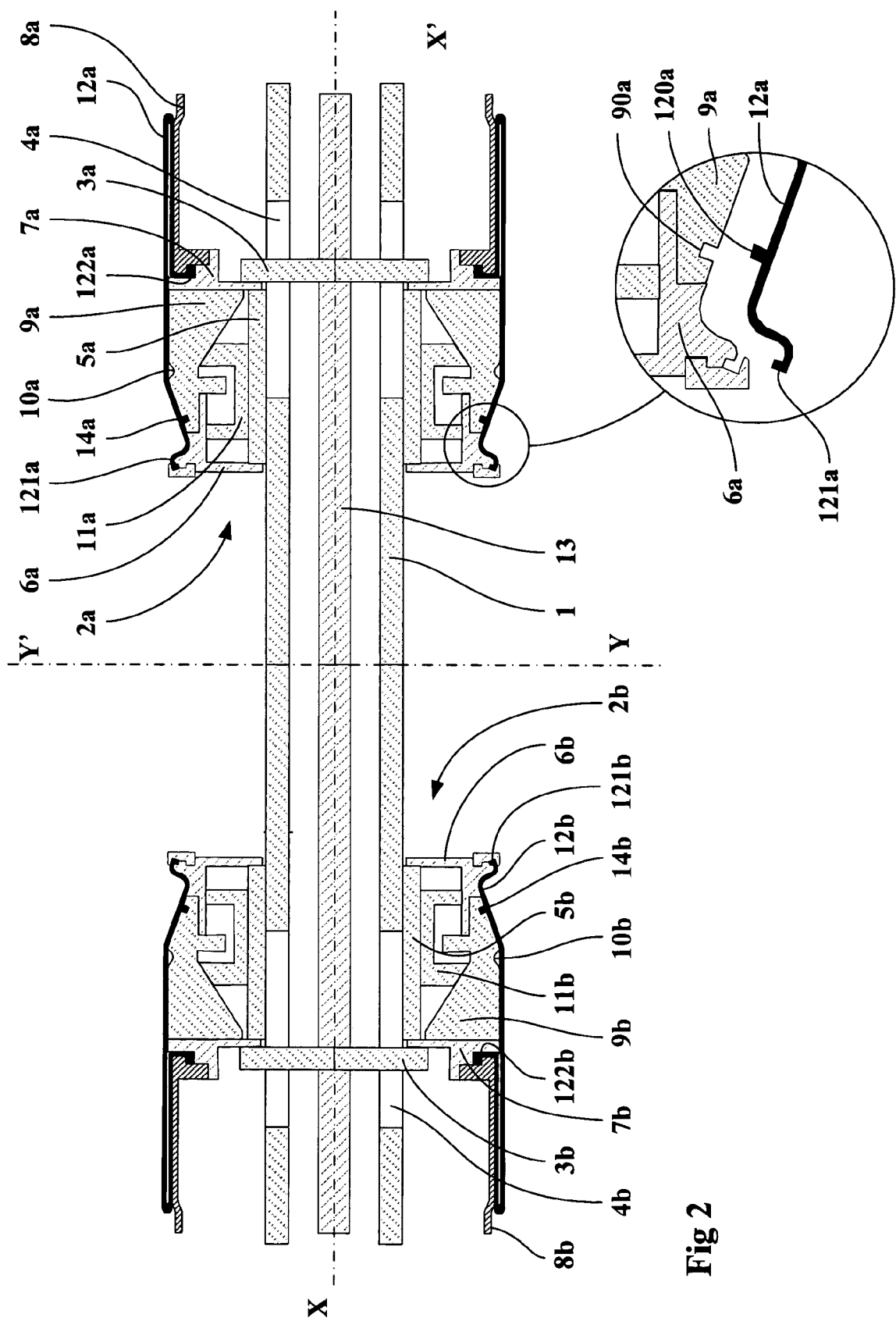
FIG. 2 shows a schematic sectioned view of a shaping drum according to the invention.

The shaping drum illustrated in FIG. 2 has all the characteristics of the shaping drum illustrated in FIG. 1. Note the anchoring (14a, 14b) of the turn-up membrane on the return segments (9a, 9b).

The return segments (9a, 9b) have a circumferential groove 90a whose shape is adapted to receive the circular protrusion 120a on the radially inner portion of the turn-up membrane (12a, 12b), as illustrated in the detail of FIG. 2. The shape of the groove section and the protrusion can be rectangular or even trapezoidal. Other shapes can be used provided that they fix the turn-up membrane (12a, 12b) firmly on the return segments (9a, 9b).

Of course, this fixing method is not limiting and it could just as well be envisaged to anchor the turn-up membrane (12a, 12b) on the return segments (9a, 9b) by fixing means such as screws (not shown) that pass through the turn-up membrane and fixed on the return segments (9a, 9b). In this configuration however, care must be taken not to affect the airtightness of the turn-up membrane.

FIGS. 3 to 8 are illustrations of the main stages in the use of the shaping drum according to the invention. The drum is represented schematically in the form of a half-section view of a bead-holding means 2a.

Figure 3:
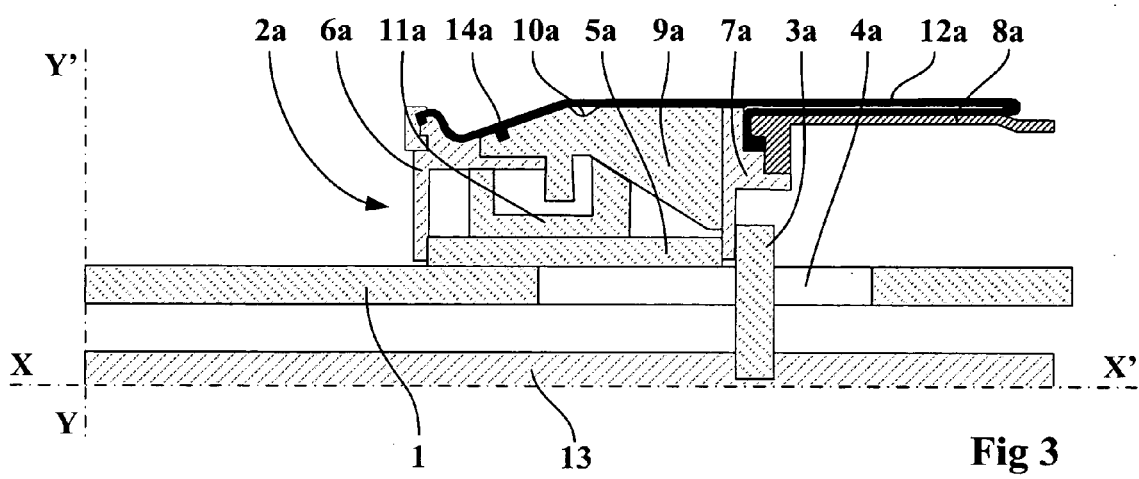
FIGS. 3 to 8 show schematic partial views of various stages during the use of a shaping drum according to the invention.

FIG. 3 shows the shaping drum in its waiting position. The segments 9a are in the low position, i.e. the diameter of the bead-holding means 2a is smaller than the bead diameter of the tire blank to be shaped.

Figure 3A:
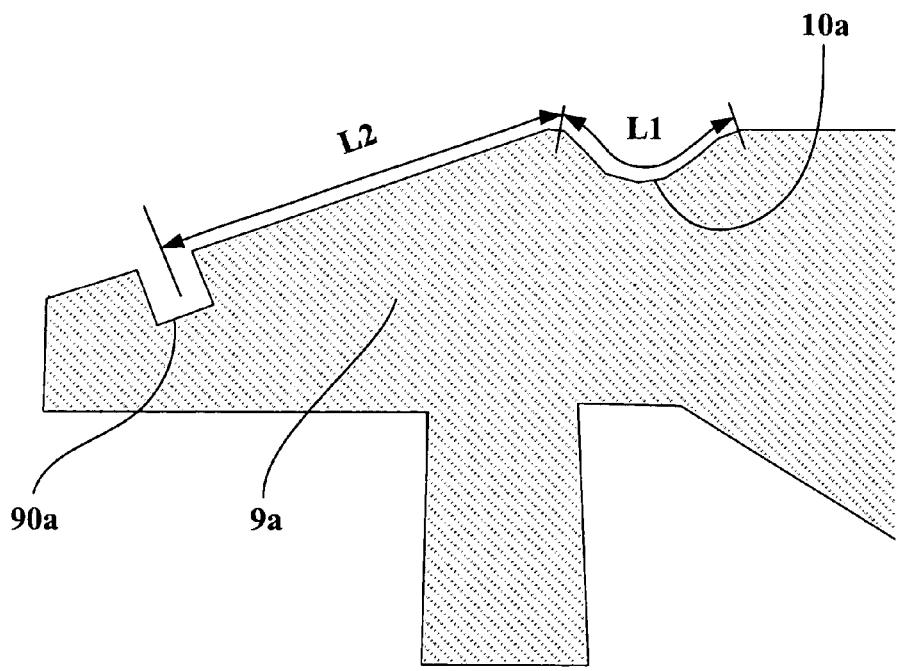

FIG. 3a shows the position of the anchoring of the membrane (90a) relative to the bead-receiving seat (10a). The length L1 corresponding to the development of the seat's section is measured relative to the centre of the radii connecting the seat with the surface of the segment 9a. The length L2 is measured in this case relative to the inner end of the groove that receives the protrusion on the membrane. However, the length L2 must be adapted to the fixing method used.

Figure 4:
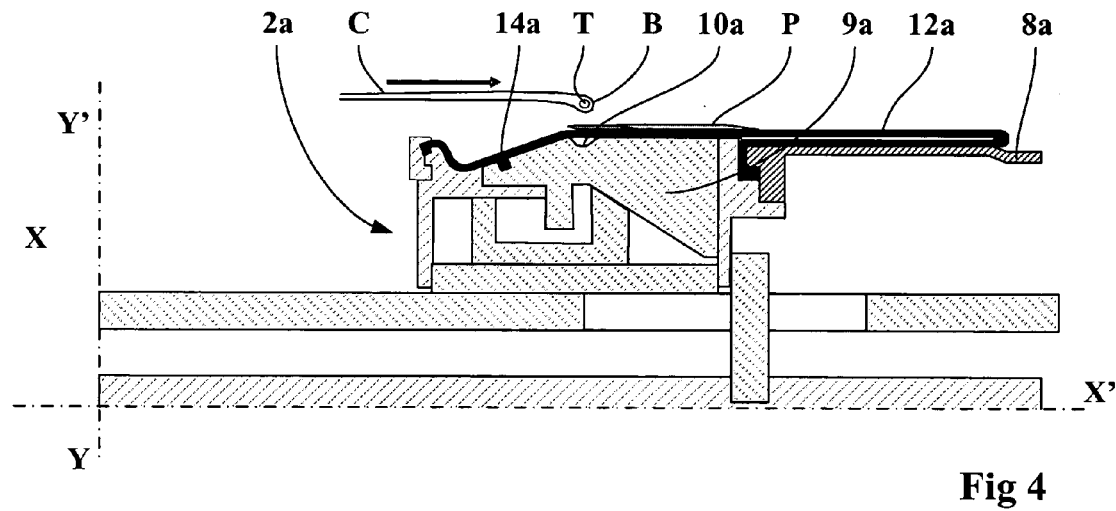

Thus, rubber profiled elements P can be laid on the outer surface of the turn-up membrane 12a resting on the extension 8a, as shown in FIG. 4. The axial position of the profiled elements is determined by the structure of the tire to be produced. In this case it can be seen that the profiled elements P cover the bead receiving seat 10a partially.

A carcass C of generally cylindrical shape is fitted on the shaping drum with the aid of means designed to carry out that particular operation (and not shown), so that the bead B is arranged vertically above the bead-receiving seat (10a).

Figure 5:
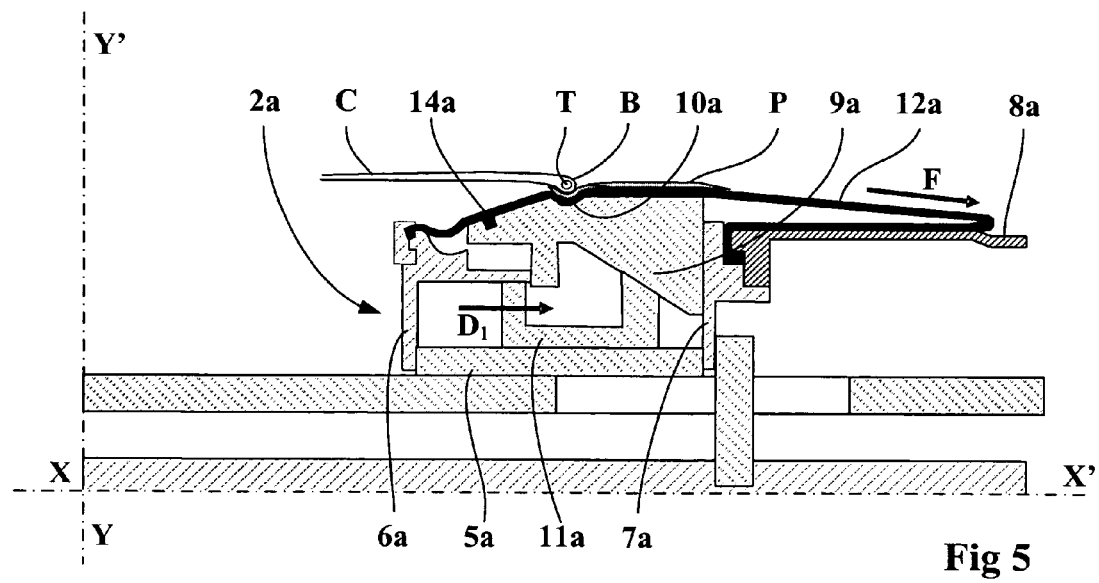

FIG. 5 shows the stage during which the carcass is gripped by the holding means 2a. The slider 11a is moved in the direction D1, the effect of this being to raise the return segments 9a in the radial direction. The profiled products P come into contact with the bead B. By adjusting the gripping pressure of the segments 9a on the bead B, airtight contact can be established between the bead B and the turn-up membrane 12a. The bead is held by the holding means at the level of the holding seat 10a, whose shape is designed to ensure that this contact is airtight.

The displacement of the return segments introduces stresses in the turn-up membrane. The resultant of these stresses amounts to an essentially axial force F whose effect is to pull the turn-up membrane axially towards the outside of the shaping drum. The anchoring means 14a of the membrane on the return segments 9a opposes this force and the axial movement of the turn-up membrane, and this avoids any axial displacement of the products P.

Figure 6:
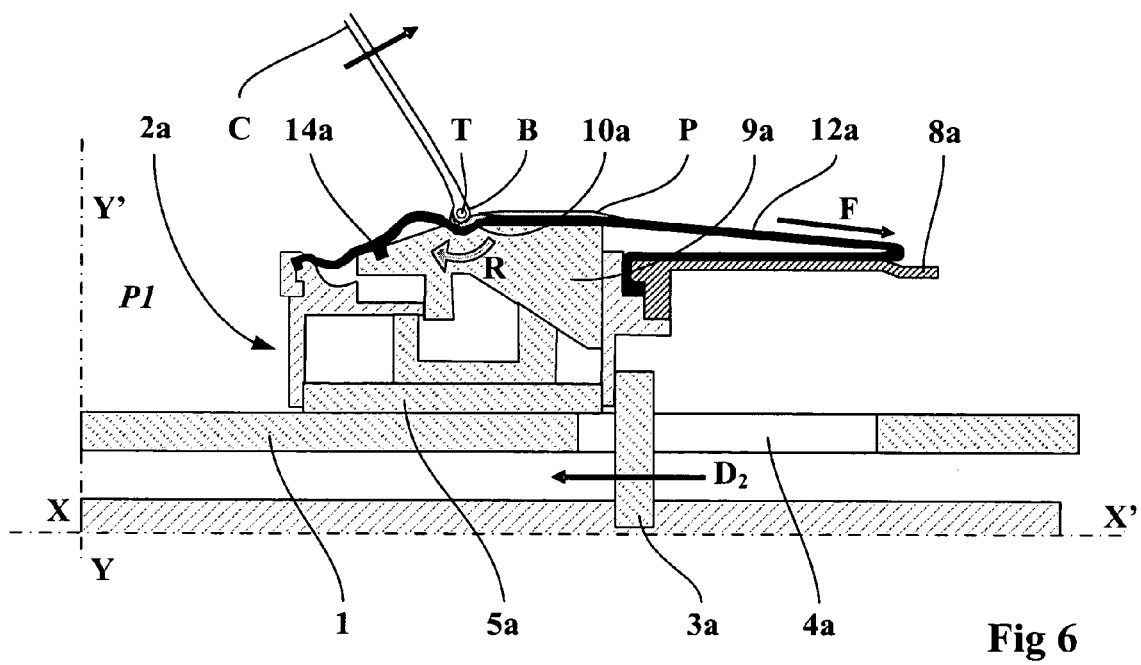

The actual shaping of the carcass C is illustrated in FIG. 6. Compressed air is injected into the inside shape delimited by the central spindle, the holding means and the carcass C. The pressure P1 in that volume inflates the tire blank, which changes from a generally cylindrical to a generally toroidal shape. The pressure increase is enabled by the airtight contacts established between the central spindle and the support 5a, between the support 5a and the circular ring 6a, between the circular ring 6a and the end of the turn-up membrane 12a, and between the turn-up membrane 12a and the bead B.

At the same time the holding means 2a and 2b move axially towards one another under the action of the mobile clamps 3a, 3b and the motorised screw 13.

During the rotation of the bead B around the reinforcement ring T of the bottom zone, the bead carries the profiled products P and the turn-up membrane 12a with it during its movement. The turn-up membrane slides over the holding segments 10a in the direction R. This results in compression of the turn-up membrane, which is locked by the anchoring 14a. When the buckling limit is reached, the turn-up membrane forms a loop in the zone between the bead B and the anchoring zone 14a, as illustrated in FIG. 6.

Figure 7:
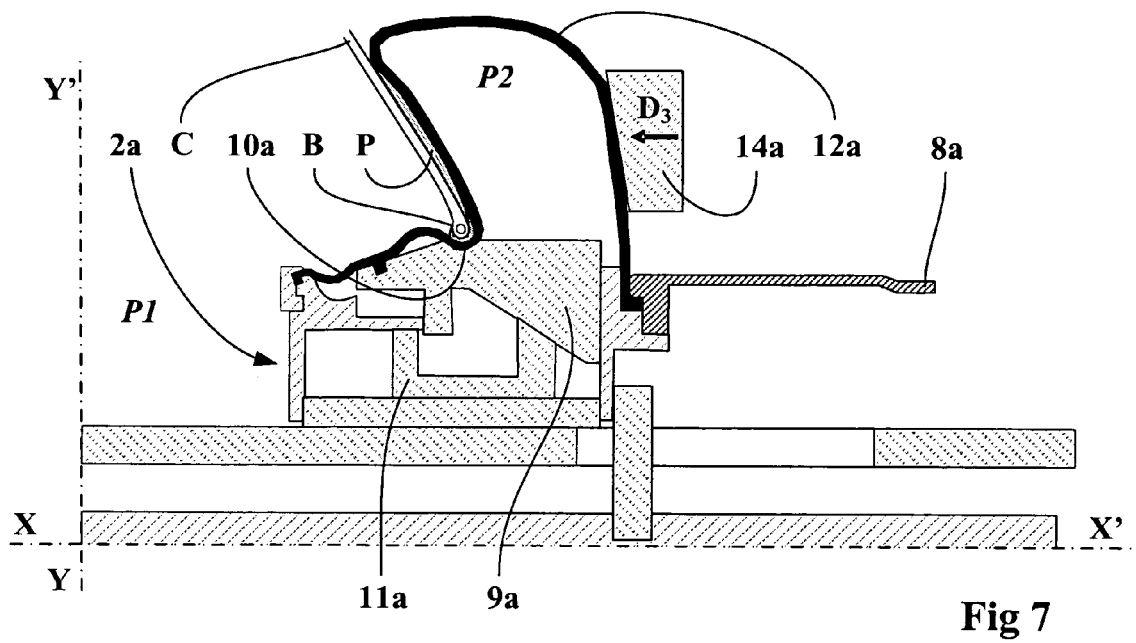

FIG. 7 shows the turn-up stage during which the inside volume of the turn-up membrane 12a is raised to a pressure P2. The effect of this is to draw the profiled products P along the outside of the carcass C. The axial thrust can be supplemented by the action of a means 14a moved in the direction D3. The pressure P2 is lower than the pressure P1 so as to avoid any axial sliding of the turn-up membrane 12a at the level of the bearing zone 10a of the bead B on the segments 9a. To that end, the gripping pressure exerted by the segments 9a on the bead B can also be regulated.

Figure 8:
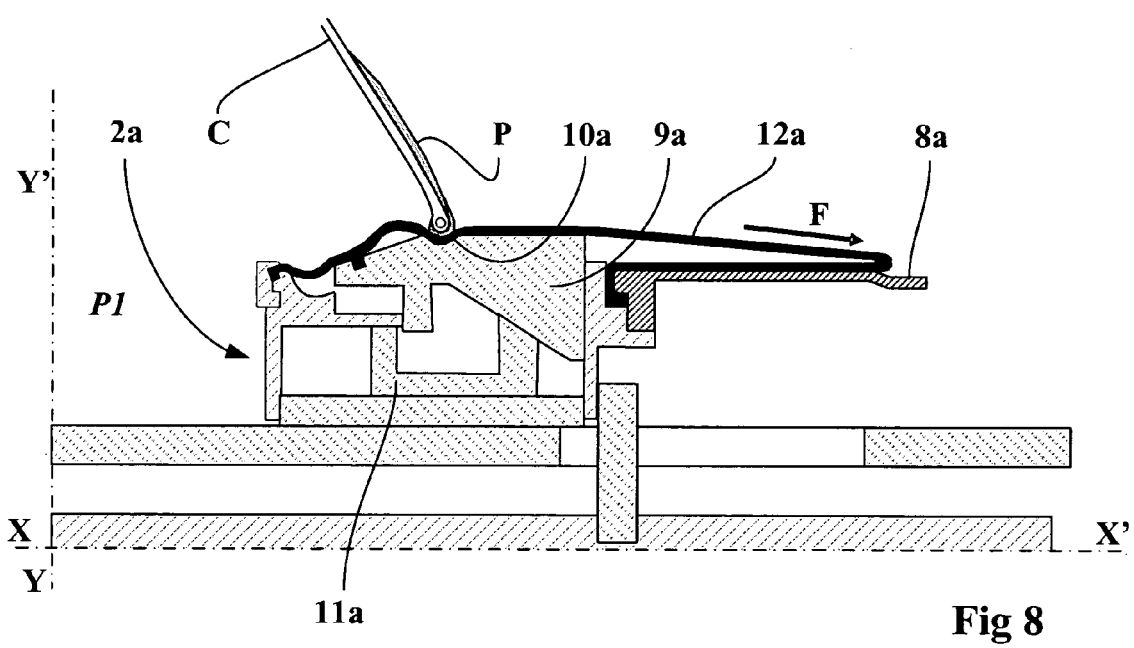

When the pressure P2 in the turn-up membrane is released, the latter collapses onto the extension 8a as illustrated in FIG. 8.

The final phase of assembling the tire blank C can then be carried out by adding the products that constitute the crown zone (not shown). During that stage, the pressure P1 is maintained inside the central space.

On completion of this stage the pressure P1 is released. The segments 9a are lowered again by actuating the slider 11a and the tire blank is extracted from the shaping drum.

The holding means are moved axially towards the outside of the drum so as to be ready to receive the carcass that forms the next tire blank.

It can then be seen that the tension F within the structure of the turn-up membrane 12a under the effect of the deformations imposed upon it brings the membrane back to its rest position as illustrated in FIG. 3.

To enable this, it is therefore important for the turn-up membrane to be made such that it can resume that rest position. Similarly, the contact zone between the turn-up membrane and the bead can be given an appropriate surface treatment to assist airtight contact between the turn-up membrane 12a and the bead B.

It would also be entirely possible to arrange the shaping drum constituting the object of this description so as to be able to carry out all the tire blank assembly operations as this is usually done by processes referred to as one-time processes. Such arrangements are not part of the present invention and do not change its nature or principles.

The invention claimed is:

1. A shaping drum for a tire blank comprising bottom zones formed of a circular reinforcement ring, the drum movable in rotation about an axis XX' and comprising bead-holding means (2a, 2b) mounted opposite one another on a central spindle (1), each of the bead-holding means comprising:
   a support (5a, 5b) mounted to be axially movable relative to the spindle (1);
   an assembly of return segments (9a, 9b) distributed circumferentially around the axis XX', which are movable radially while guided by and between two circular rings (6a, 7a, 6b, 7b) fixed on the support (5a, 5b), and comprising a bead-receiving seat (10a, 10b); and
   a turn-up membrane (12a, 12b) that can slide over the bead-receiving seat, anchored in an airtight manner by its two ends (121a, 122a, 121b, 122b) on the radially outer circumference of the circular rings (6a, 7a, 6b, 7b) and anchored mechanically by appropriate means (14a, 14b) on the return segments (9a, 9b) along a circumferential anchoring line (90a),
   wherein the section of the bead-receiving seat (10a, 10b) is of essentially circular shape with a developed length L1, and the circumferential anchoring line of the turn-up membrane (12a, 12b) on the return segments (9a, 9b) is axially offset towards the centre of the drum by a length L2 relative to the bead-receiving seat (10a, 10b), the length L2 being between 0.7 and 2 times the length L1.

2. The shaping drum according to claim 1, in which the contact between the axially movable support (5a, 5b) and the central spindle (1) is airtight.

3. The shaping drum according to claim 2, comprising means that enable compressed air to be injected into a central space delimited by the central spindle (1) and the bead-holding means (2a, 2b).

4. The shaping drum according to claim 1, in which the means for anchoring the turn-up membrane (12a, 12b) on the return segments (9a, 9b) comprises a circular protrusion (120) formed on the turn-up membrane (12a, 12b) which co-operates with a circumferential groove (90) formed in the return segments (9a, 9b).

5. The shaping drum according to claim 1, in which the turn-up membrane (12a, 12b) is anchored on the return segments (9a, 9b) by fixing means that pass through the turn-up membrane and are attached to the return segments (9a, 9b).

6. The shaping drum according to claim 1, in which, when a tire blank is fitted onto the drum opposite the bead-receiving seats (10a, 10b), the beads (B) of the tire blank (C) to be shaped are in airtight contact with the turn-up membrane (12a, 12b) upon expansion of the return segments (9a, 9b).

\* \* \* \* \*